United States Patent [19]

Hanson

[11] 4,033,614
[45] July 5, 1977

[54] CONDUIT FITTING
[75] Inventor: Ronald P. Hanson, Sycamore, Ill.
[73] Assignee: Ideal Industries, Inc., Sycamore, Ill.
[22] Filed: Mar. 1, 1976
[21] Appl. No.: 662,463
[52] U.S. Cl. .................... 285/248; 285/382.7
[51] Int. Cl.² ................................. F16L 33/20
[58] Field of Search ........ 285/248, 249, 250, 382.7

[56] References Cited
UNITED STATES PATENTS

| | | | |
|---|---|---|---|
| 2,321,260 | 6/1943 | Stecher | 285/249 |
| 2,579,529 | 12/1951 | Woodling | 285/382.7 X |
| 2,782,060 | 2/1957 | Appleton | 285/248 |
| 3,006,664 | 10/1961 | Appleton et al. | 285/248 |
| 3,030,130 | 4/1962 | Appleton | 285/248 |
| 3,219,367 | 11/1965 | Franck | 285/382.7 X |
| 3,239,252 | 3/1966 | Schmitt et al. | 285/250 |
| 3,659,880 | 5/1972 | Goldsobel | 285/248 X |
| 3,708,186 | 1/1973 | Takagi et al. | 285/382.7 X |
| 3,791,680 | 2/1974 | Cleare | 285/248 |

FOREIGN PATENTS OR APPLICATIONS

| | | | |
|---|---|---|---|
| 882,115 | 11/1961 | United Kingdom | 285/249 |
| 818,674 | 8/1959 | United Kingdom | 285/249 |

Primary Examiner—Thomas F. Callaghan
Attorney, Agent, or Firm—Kinzer, Plyer, Dorn & McEachran

[57] ABSTRACT

This is concerned with a conduit fitting for use with so-called flexible metallic conduit which has an inner, helically wound metal core covered by a flexible insulating sheath or coat of rubber or the like. The fitting is specifically constructed and adapted to provide a liquid-tight seal and mechanical connection between the ends of the conduit and the fitting with the mechanical connection and liquid-tight seal being affected by the same structure.

3 Claims, 2 Drawing Figures

U.S. Patent  July 5, 1977  4,033,614

CONDUIT FITTING

SUMMARY OF THE INVENTION

This is concerned with a liquid-tight conduit fitting which is specifically constructed and arranged to be used on the end of so-called flexible metallic conduit where a helically wound metal core on the inside is covered by an insulating sheath or cover on the outside which may be of rubber or plastic or a material having the general characteristics of rubber or plastics as to flexibility and distortability, as well as the insulating qualities thereof.

A primary object of the invention is a fitting of the above type which will protect the electric wires and will prevent the rough edges of the cut end of the conduit from unbraiding or damaging the insulation of the wires.

Another object is a fitting of the above type which uses an all plastic ferrule on the inside.

Another object is a fitting of the above type which provides both a mechanical and a liquid-tight seal by the same part.

Another object is a fitting of the above type which does not thread into the interior of the conduit.

Another object is a fitting of the above type which is specifically arranged for use with larger diameter conduit, for example something on the order of 1-1/2 inches in diameter and up.

Another object is a fitting assembly that is very easy to apply since the ferrule needs only to be slipped on to the end of the conduit and thereafter the fitting is closed by a threading action.

Another object is a fitting of the above type which in addition to providing a liquid-tight seal also mechanically interconnects the conduit to a terminus to prevent it from being pulled out.

Another object is a fitting of the above type which does not rely upon a threaded interlock with the inside of the conduit.

Other objects will appear from time to time in the ensuing specification and drawings.

DESCRIPTION OF THE PREFERRED EMBODIMENTS

Figure 1:
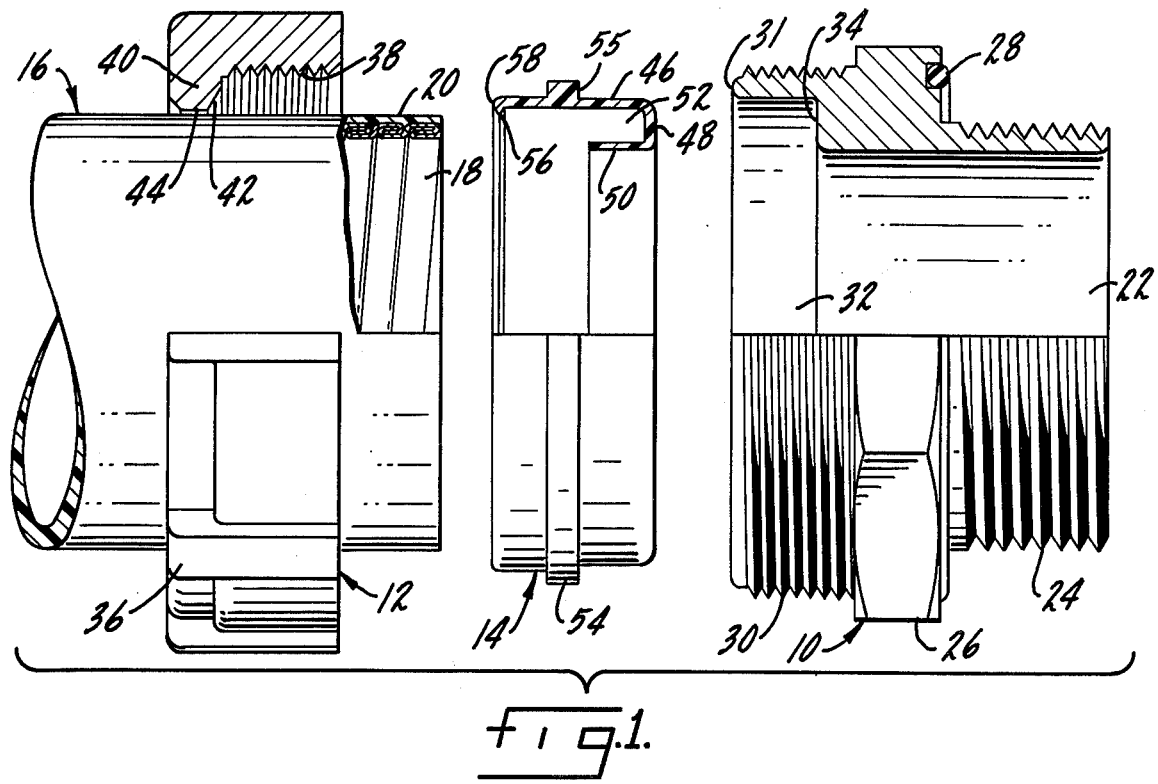
FIG. 1 is an exploded side view, partly in section, of the fitting.

In FIG. 1 a fitting has been indicated generally at 10 with a nut at 12 and a ferrule 14 between them, all of which go together as explained hereinafter in connection with FIG. 2 in a mounting on the end of flexible metallic conduit indicated generally at 16. It will be understood that the conduit, which is old and conventional, has a helically wound metal core 18 covered by a sheath or insulating cover 20 which may be considered to be made of any suitable insulating material, such as plastic or rubber or any material having the general characteristics of rubber or plastic as to distortability, flexibility and insulating qualities.

Considering the parts individually, the fitting 10 has a generally open central bore or passage 22 with external somewhat tapered threads 24 on the ends thereof for fitting into a terminus. The center of the fitting is enlarged somewhat at 26 into an octagon, or any number of sides, with a seal ring 28 in the face thereof adjacent the tapered threads 24. The other end of the fitting has an enlarged thread formation 30 to mesh with the nut 12 with a projecting end 31. The bore at the left end is also enlarged somewhat at 32 and provides a shoulder or offset 34.

Skipping to nut 12, it may have an octagon-like exterior 36 or the like so that it may be turned with a wrench or any suitable tool. The central passage or bore through the nut may have a somewhat enlarged threaded section 38 to mesh with the threads 30 on the fitting and a reduced section at 40 with a tapered surface 42 coming from the threads down to a narrow cylinder 44 for reasons explained hereinafter. It will be observed that the narrow cylindrical surface 44 very closely approaches the exterior of the flexible metallic conduit.

The ferrule 14 has a main central body 46 which is generally cylindrical and may be thought of as having a generally constant wall thickness, except as explained hereinafter. In the arrangement shown, the right end of the main body has or turns into a transverse wall 48 which, on its inner peripheral edge, turns back into a generally cylindrical pilot 50 which is somewhat shortened, compared to the overall axial length of the ferrule but may be of any suitable length sufficient to provide an annular socket 52 to accept the end of the flexible metallic conduit, as shown in FIG. 2.

Figure 2:
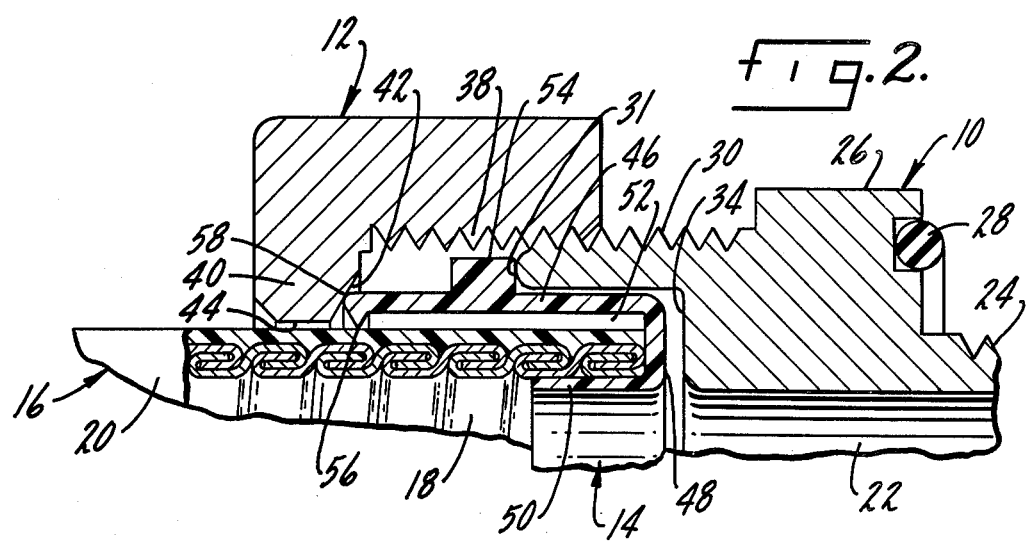
FIG. 2 is a side view similar to FIG. 1 but with the fitting assembled on the end of a conduit.

The outside of the ferrule has an outstanding rib 54 which, as shown, is peripherally continuous with an outside diameter that still allows the ferrule to slide inside of the nut 12, as shown in FIG. 2. The rib 54 provides a shoulder 55 to contact and seal against flat 31 on the fitting 10. The left edge of the ferrule terminates in an inwardly projecting circumferentially continuous tooth or ridge 56 with a contact area 58 on the axial leading edge bounding and somewhat forward of the tooth or ridge 56 such that the round or radius 58, when the parts are assembled, will contact the taper 42, as shown in FIG. 2. The entire ferrule is preferably made of plastic and is molded as an integral homogenous unit and the dimensioning is such that the parts generally assemble and interfit as shown in FIG. 2 with the nut 12 being first slipped over the end of the flexible metallic conduit, the ferrule then being positioned over the end of the conduit with the pilot 50 inside and the end of the conduit up in the socket 52 and the fitting 10 thereafter being applied to thread into the threads of the nut 12.

The use, operation and function of the invention are as follows:

The object of the connector is to attach flexible metallic conduit to a terminus, such as an electrical box or the like. The ferrule is used to protect the electrical wires from the rough edges of the cut end of the conduit. The ferrule also serves to mechanically attach the conduit to the fitting and prevents it from pulling out. In effect, the nut and fitting provide a compression chamber which, upon closing of the nut and fitting together, axially thrusts the ferrule into the taper 42 in the nut to drive or force the tooth or ridge 56 into the insulating cover or sheath 20 on the conduit. The contact or circumference 31 on the fitting will contact the upstanding shoulder provided by the rib, as shown in FIG. 2, and upon further closing of the compression chamber the axial thrust provided against the ferrule will bevel the tooth 56 inwardly against taper 42 until it locks up. The tooth or ridge 56 will dig into or indent the sheath or cover 20 to a certain degree for two purposes, first to provide a liquid-tight seal around the conduit and, second, to mechanically interlock the fitting to the conduit. Note that the dimensioning is such that when annulus 31 contacts the rib 54, there is space between the end wall 48 of the ferrule and the offset 34 in the fitting.

Note that the inside of the pilot 50 and main body 46 merely slip on the end of the conduit. The pilot does not thread or attempt to thread into the helically wound metal core 18. Because of manufacturing variations in size, an assembly in which a pilot attempts to thread into the inside of the helical thread form in the conduit can be very difficult, if not impossible. In the present arrangement, the ferrule merely slips over the end of the conduit and the mechanical interconnection as well as the liquid-tight seal is provided by the tooth or ridge 56. The ferrule is made of one piece plastic. The pilot 50 lines the inside of the conduit and merges into the transverse wall or flange 48 which covers the end of the conduit. This protects the electric wires from the cutting edges of the conduit. The flange or transverse wall 48 merge with the outer body or cylinder 46 which surrounds the conduit. The rib or ring 54 supports the ferrule while the conical shape of the compression nut 12 wedges the open end of the ferrule against the plastic covering off the conduit. At the same time, the compression nut and fitting are locked between or around the rib or ring 56, on the one hand, and the flat or contact 58 adjacent the tooth 56 on the other.

This approach saves considerable assembly time and reduces the expense and effort in effecting a joint of this type as compared to units where the ferrule must be threaded inside of the flexible metallic conduit. While the unit has been shown in connection with a straight-through fitting, it should be understood that it may be an integral part of an elbow, a box, or what-have-you.

This structure provides a number of seals to block off leak paths to prevent moisture from getting inside of the conduit. For example, the compression contact of 31 against 55 blocks moisture that might go through threads 30-38. Any moisture that might enter through the front end at 44 is blocked by the compression fit of surface 58 against taper 42 and also by the rib 56 digging into the flexible cover 20. In short, the chamber 52 inside of the plastic ferrule around the end of the flexible conduit is sealed, as is the chamber formed by surface 34.

While a preferred form and several variations of the invention have been shown and suggested, it should be understood that suitable additional modifications, changes, substitutions and alterations may be made without departing from the invention's fundamental theme.

The embodiments of the invention in which an exclusive property or privilege is claimed are defined as follows:

1. A connector assembly for joining flexible metallic conduit to a terminus, including a fitting and nut threaded together for relative rotation and defining an annular compression chamber between them, a plastic ferrule in the compression chamber having a generally cylindrical main body adapted to be mounted on the end of the conduit, an outstanding circumferential shoulder on the main body of the ferrule intermediate the ends thereof to receive an axial thrust from the compression chamber upon closing thereof, an inwardly directed peripherally continuous tooth on one end of the main body arranged to be compressed inwardly into liquid-tight sealing relation with the outside of the conduit upon closing of the compression chamber, a transversely disposed inwardly directed annular end wall on the other end of the main body of the ferrule, a double-backed generally cylindrical pilot on the inner circumference of the end wall in spaced relationship to the main body and forming a socket therewith and dimensioned for free reception of the end of the flexible metallic conduit, an annular taper in the compression chamber on the nut opposite and effective against the one end of the main body of the ferrule with the circumferential tooth to cause deflection of the tooth peripherally inwardly into tight sealing relation with the outside of the conduit, the double-backed pilot having smooth cylindrical inner and outer surface with diameters that effect a sliding relation with the inside and outside of the conduit, the dimensioning of the ferrule being such that it will freely slide onto the end of the conduit with the inside diameter of the main body of the ferrule being slightly larger than the outside diameter of the conduit, the axial spacing between the shoulder and the tooth and the radial thickness of the main body of the ferrule in between, on the one hand, and the axial spacing between the annular taper on the nut and the fitting, on the other hand, being such that the tooth will flex inwardly into liquid-tight sealing relation with the outside of the conduit upon axial closing of the compression chamber without effecting excessive resistance to such closing and will lock up with the tooth still inside of the compression chamber without the annular end wall of the ferrule engaging the fitting, the portion of the ferrule in between the tooth and the shoulder being flexed under the axial loading applied between the shoulder, on the one hand, and the tooth, on the other, and without permanent deformation.

2. The structure of claim 1 in which the shoulder is peripherally continuous.

3. The structure of claim 1 further characterized in that the outstanding shoulder is in the form of a rib with shoulders on both sides thereof facing in opposite axial directions, the wall thickness of the ferrule on each side of the rib being generally uniform.

* * * * *